United States Patent [19]

Erbes

[11] Patent Number: 5,683,216

[45] Date of Patent: Nov. 4, 1997

[54] SPRING LATCHING MECHANISMS FOR PREVENTING RELATIVE MOVEMENT OF ASSEMBLED COMPONENTS

[75] Inventor: John Geddes Erbes, Mt. View, Calif.

[73] Assignee: General Electric Company, San Jose, Calif.

[21] Appl. No.: 382,560

[22] Filed: Feb. 2, 1995

[51] Int. Cl.$^6$ ................................................ F16B 39/02
[52] U.S. Cl. ........................... 411/120; 411/121; 411/83; 411/128; 411/514
[58] Field of Search ..................... 292/80; 411/81, 411/83–85, 90–91, 95, 120, 121, 128, 514, 515, 516, 530, 217, 218, 219, 948, 939, 352; 267/41, 158, 159, 163

[56] References Cited

U.S. PATENT DOCUMENTS

| | | | |
|---|---|---|---|
| 731,366 | 6/1903 | House | 411/190 |
| 861,139 | 7/1907 | Newman | 411/217 |
| 893,066 | 7/1908 | Fletcher et al. | 411/322 |
| 994,726 | 6/1911 | Dorman | 411/352 |
| 1,301,958 | 4/1919 | Mendenhall | 411/83 |
| 2,079,056 | 5/1937 | Warren | 470/16 |
| 2,741,290 | 4/1956 | Wolfe | 411/83 |
| 3,596,606 | 8/1968 | Smith, Jr. et al. | 104/172 |
| 3,695,324 | 10/1972 | Gulistan . | |
| 4,119,131 | 10/1978 | Cosenza | 411/352 |
| 4,139,755 | 2/1979 | Hastings et al. | 200/295 |
| 4,645,393 | 2/1987 | Pletcher | 411/84 |
| 4,854,795 | 8/1989 | Duran | 411/352 |
| 5,106,586 | 4/1992 | Muszak et al. | 422/99 |
| 5,207,543 | 5/1993 | Kirma | 411/121 |
| 5,402,570 | 4/1995 | Weems et al. | 29/890.031 |
| 5,573,311 | 11/1996 | Clohessy | 301/105.1 |
| 5,597,278 | 1/1997 | Peterkort | 411/134 |

FOREIGN PATENT DOCUMENTS

| | | | |
|---|---|---|---|
| 566436 | 10/1993 | European Pat. Off. | 267/158 |
| 10240 | 1/1880 | Germany . | |

OTHER PUBLICATIONS

GE Proposal No. 894–1D7DM–EK1, Revision 1, Core Spray Line Crack Repair, Dec. 9, 1993.

Shroud Repair, Description of Alternatives, Alan N. Baker, Mar. 1994.

Apr. 22, 1994 letter from Al Kozusko & Thomas Sliva of AEA O'Donnell, Inc. to Victor Bain of General Electric Company with annexed Description, facsimile cover sheet and drawings.

Presentation No. 94–004 dated May 2, 1994, by Welding Services Inc. and Structural Integrity Associates, Inc.

*Primary Examiner*—Steven N. Meyers
*Assistant Examiner*—Donald J. Lecher
*Attorney, Agent, or Firm*—James E. McGinness; Dennis M. Flaherty

[57] ABSTRACT

Spring latching mechanisms for preventing relative rotation or relative displacement of assembled components during operation of a nuclear reactor. The first type of mechanism prevents rotation of a threaded fastener which fastens a first component to a second component. The fastener has a multiplicity of longitudinal recesses formed on an outer circumferential surface thereof. The spring latching mechanism has a cantilever beam supported at one end by the first component. The other end of the cantilever beam is displaceable between first and second positions as the cantilever beam flexes. An interlocking member connected to the second end of the cantilever beam fits engages one of the longitudinal recesses in the fastener, whereby rotation of the fastener can be blocked. The second type of mechanism positively locates and prevents vibration-induced wear of first and second components assembled with play therebetween. The latter spring latching mechanism is a double cantilever spring installed between the first and second components in a flexed state with latched engagement and sufficient preload to prevent rubbing of the first and second components against each other. The double cantilever spring has one leg in contact with the first component and the other leg in contact with the second component.

10 Claims, 8 Drawing Sheets

SPRING LATCHING MECHANISMS FOR PREVENTING RELATIVE MOVEMENT OF ASSEMBLED COMPONENTS

1. Field of the Invention

This invention relates to the design of nuclear reactors having assembled components which do not move relative to each other under the influence of steady-state or vibratory operating modes. In particular, the invention relates to mechanisms for preventing relative rotation or relative displacement of assembled components during operation of a reactor.

2. Background of the Invention

Figure 1:
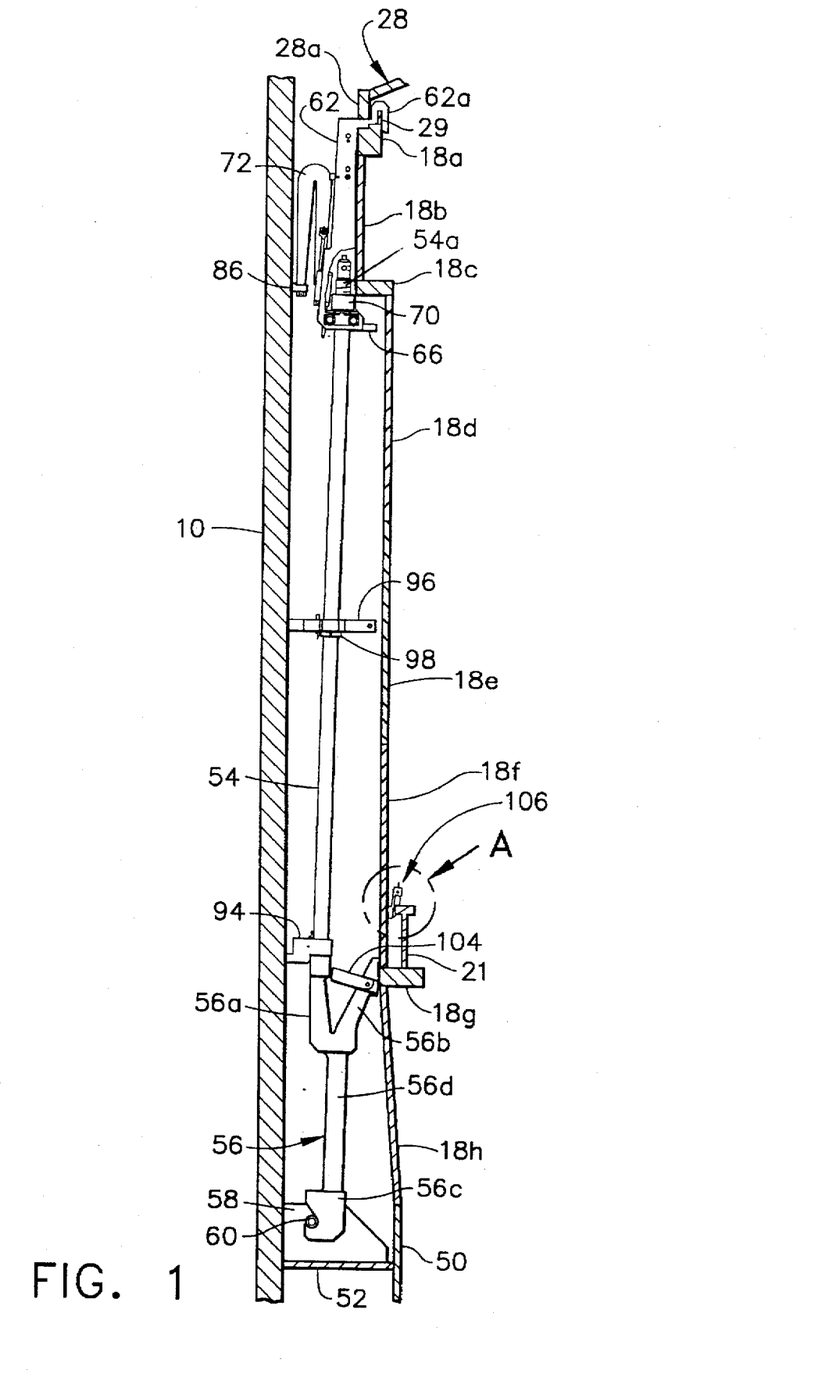
FIG. 1 is an elevation view of a core shroud repaired using assembled components which are latched against uncoupling using the latching mechanisms of the present invention.

As seen in FIG. 1, a conventional boiling water reactor (BWR) has a reactor pressure vessel 10 and a core shroud 18 arranged concentrically in the RPV with an annular region (namely, the downcomer annulus) therebetween. The core shroud 18 is a stainless steel cylinder surrounding the nuclear fuel core (not shown). The core is made up of a plurality of fuel bundle assemblies. Each array of fuel bundle assemblies is supported at the top by a top guide (not shown) and at the bottom by a core plate 21 (only a portion of which is shown in FIG. 1). During operation of the reactor, water is continuously recirculated down the downcomer annulus and then up through the core. This flow is induced by a multiplicity of jet pumps located in the downcomer annulus and driven by recirculation pumps outside the reactor pressure vessel.

The core shroud 18 comprises a shroud head flange 18a for supporting the shroud head 28; a circular cylindrical upper shroud wall 18b having a top end welded to shroud head flange 18a; an annular top guide support ring 18c welded to the bottom end of upper shroud wall 18b; a circular cylindrical middle shroud wall comprising three sections 18d, 18e and 18f welded in series, with a top end of section 18d being welded to top guide support ring 18c; and an annular core plate support ring 18g welded to the bottom end of middle shroud wall section 18f and to the top end of a lower shroud wall 18h. The entire shroud is supported by a shroud support 50, which is welded to the bottom of lower shroud wall 18h, and by annular shroud support plate 52, which is welded at its inner diameter to shroud support 50 and at its outer diameter to RPV 10. The core plate 21 is bolted to and supported by the core plate support ring 18g.

In the event of a seismic disturbance, it is conceivable that the ground motion will be translated into lateral deflection relative to the reactor pressure vessel of those portions of the shroud located at elevations above shroud support plate 52. Such deflections would normally be limited by acceptably low stresses on the shroud and its weldments. However, if the shroud weld zones have failed due to stress corrosion cracking, there is the risk of misalignment and damage to the core and the control rod components, which would adversely affect control rod insertion and safe shutdown.

Stress corrosion cracking in the heat affected zone of any shroud girth seam welds diminishes the structural integrity of shroud 18, which vertically and horizontally supports core top guide (not shown) and shroud head 28. In particular, a cracked shroud increases the risks posed by a loss-of-coolant accident (LOCA). During a LOCA, the loss of coolant from the reactor pressure vessel produces a loss of pressure above the shroud head 28 and an increase in pressure inside the shroud, i.e., underneath the shroud head. The result is an increased lifting force on the shroud head and on the upper portions of the shroud to which the shroud head is bolted. If the core shroud has fully cracked girth welds, the lifting forces produced during a LOCA could cause the shroud to separate along the areas of cracking, producing undesirable leaking of reactor coolant.

One solution to the foregoing problem is to retrofit the reactor with shroud and core plate restraints. In accordance with a novel design, these restraints are constructed from assembled components. During reactor operation, these assemblies are constantly subjected to both steady-state loads and flow-induced vibrations, which could lead to excessive wear of abutting components and even uncoupling of assembled components. Thus, there is a need to restrain reactor components against relative movements.

The prior art techniques for preventing relative movements of assembled components inside a reactor have certain drawbacks. One technique is to tack weld assembled components. However, tack welding must be performed underwater under remote control and tack-welded fastener is not reusable. Another technique is crimping, which also results in components which are not reusable.

SUMMARY OF THE INVENTION

The present invention is a latching mechanism which can be utilized to lock assembled components so that relative movements are prevented. In accordance with the preferred embodiments of the present invention, these latching mechanisms are incorporated in apparatus for restraining a cracked shroud against vertical and lateral deflection and in apparatus for restraining a core plate and the fuel assemblies seated thereon against lateral deflection relative to the core shroud. However, the latching mechanisms have general application in situations where two assembled components must be fastened tightly together.

Typically, three to eight shroud restraint assemblies are preferably distributed at about equal angular intervals around the shroud periphery and installed between jet pump assemblies. Each shroud restraint assembly incorporates a corresponding plurality of latching mechanisms in accordance with the invention. Also each core plate wedge assembly incorporates a latching mechanism in accordance with the invention. One type of latching mechanism is used to prevent rotation and loosening of assembled components such as nuts and bolts. Another type of latching mechanism is installed between assembled components having play therebetween with sufficient preload to prevent relative displacements of the assembled components induced by vibrations or steady-state loads and accelerated wear or loosening of components resulting from those displacements.

The shroud restraint assemblies limit separation of a shroud along cracks in the girth welds or heat affected zones thereof in response to lifting pressure on the shroud head. The repair method involves the placement of a plurality of tie rods (e.g., four) in the downcomer annulus at respective azimuthal positions, each of the tie rods having one end anchored to the shroud support plate. A reactor can be retrofitted by machining holes in the shroud support plate or in a plurality of existing gusset plates welded thereto, depending on the original shroud support design. The lower end of each tie rod is then anchored to the shroud support plate by means of a coupling with a corresponding hole. The upper tie rod support is latched over the top edge of the shroud to counteract lifting forces exerted on the shroud by the top guide and bolts which hold down the shroud head. To accommodate the upper support, notches are machined in the shroud head ring of the shroud head at positions aligned with the tie rod locations. Alternately, notches are machined in the shroud flange. Each notch at a respective azimuthal position allows space for an upper support bracket. The upper end of the tie rod is coupled to the upper support bracket assembly by a threaded tensioning nut.

The upper support bracket assembly incorporates a hooking means which seats on the shroud flange. A tension is applied to the hooking means by tightening the tensioning nut on a threaded upper portion of the tie rod. As the nut travels down the tie rod, it tensions the upper support bracket assembly so that the hooking means holds the shroud flange in a fixed vertical position relative to the shroud support plate, to which the tie rod is anchored. The tensioning nut is latched to prevent vibration-induced rotation using a spring latching mechanism in accordance with the present invention.

In addition, upper and lower stabilizers are coupled to each tie rod assembly to restrain the shroud against lateral deflection relative to the reactor pressure vessel. The upper stabilizer is mounted on the upper support bracket assembly; the lower stabilizer is integrated with the tie rod assembly. Preferably, the upper stabilizers are installed near the elevation of the top guide support ring, while the lower stabilizers are installed near the elevation of the core plate support ring.

Each upper stabilizer is a double cantilever "wishbone" spring resiliently wedged between the shroud and RPV. The springs exert radially inwardly directed forces that resist lateral deflection of the shroud relative to the RPV. In addition, the double cantilever wishbone spring mounting adjusts to varying width of the downcomer annulus. Each upper stabilizer spring is slidably wedged into place by tightening of a jack bolt. When the desired preload has been produced, the jack bolt is latched to prevent vibration-induced rotation using a pair of spring latches in accordance with the present invention.

Each lower stabilizer spring laterally supports the shroud at the core plate, against the vessel, via a lower contact spacer. The lower spring assembly is installed with a controlled preload, obtained by machining a contact pad of the lower contact spacer to match the measured assembly fitup. The lower contact spacer is coupled to the lower end of tie rod by means of a spring latching mechanism in accordance with the present invention. The spring latching mechanism is installed between the lower contact and the tie rod to prevent upward motion of the contact spacer, which could allow it to disengage from the gap it is required to fill in its assembled position. It is installed with sufficient preload to prevent vibration-induced rubbing and consequent wear of the assembled components.

A middle support may be attached to a mid-portion of the tie rod. The middle support is preloaded against the reactor pressure vessel at assembly by radial interference, the preload being sufficient to bend the tie rod. This provides mid-span support for the tie rod, thereby improving its resistance to failure due to vibratory excitation. The middle support also provides a lateral motion limit stop for the shroud central shell, in the event of complete failure of its girth welds. Vertical displacement of the middle support relative to the tie rod could impair its function by incorrect location and allow loosening in the angular space between the tie rod and vessel wall. Thus, vertical displacement is blocked using a spring latching mechanism in accordance with the present invention. Again, the spring latching mechanism is installed between the middle support and the tie rod with sufficient preload to prevent vibration-induced rubbing and consequent wear of the assembled components.

Finally, a core plate wedge assembly restrains the core plate against lateral deflection relative to the shroud. A plurality of core plate wedge assemblies (e.g., four) are placed in the circumferential gap between the circular outer peripheral edge of the core plate and the circular cylindrical wall of the shroud at respective azimuthal positions. These core plate wedge assemblies are wedged into place to maintain the spacing between the core plate and the shroud, thereby maintaining the alignment of the fuel assemblies. The core plate wedge assemblies further serve to transmit loads from the nuclear fuel core to the core shroud at locations where lateral shroud restraints contact the shroud.

Each core plate wedge assembly comprises a core plate wedge and a core plate wedge clip which slide against each other in response to rotation of a wedge bolt. As the wedge and wedge clip mutually slide, the distance between a pair of parallel contact surfaces increases until the contact surfaces abut the shroud wall and the outer edge of the core plate respectively. The wedge bolt is then tightened further until the desired amount of preload is obtained, at which point the wedge bolt is locked against further rotation relative to the core plate wedge by engagement of a pair of spring latches in accordance with the present invention.

Thus, the latches in accordance with the invention can be employed to prevent relative displacement or relative rotation of assembled reactor components. All of the latches are spring-loaded locking devices which cause preloaded engagement of a latch key into a mating slotted member to positively prevent their relative motion. The latches are both reusable and easily replaceable. Further, assembly and disassembly are achieved by only compressing the latch disengage the locking feature using a simple tool. In the case where the latches are used to lock a bolt against rotation, the tool that compresses the latch is part of the tool that rotates the bolt.

DETAILED DESCRIPTION OF THE PREFERRED EMBODIMENTS

Referring to FIG. 1, a shroud restraint tie rod assembly incorporating the present invention comprises a tie rod 54 having a circular cross section. A lower end of tie rod 54 is anchored in a threaded bore formed in the end of a spring arm 56a of a lower spring 56. Tie rod 54 extends from the end of spring arm 56a to a position adjacent the outer circumferential surface of the top guide support ring 18c. The upper end of tie rod 54 has a threaded portion.

The lower spring 56 is anchored to a gusset plate 58 attached to the shroud support plate 52. The gusset is part of the original construction in some reactors, or is otherwise bolted in place as part of the repair. The lower spring 56 has a slotted end which straddles gusset plate 58 and forms a clevis hook 56c. The clevis hooks under opposite ends of a clevis pin 60 inserted through a hole machined in the gusset plate 58. Engagement of the slotted end with the gusset plate 58 maintains alignment of lower spring 56 under the action of seismic motion of the shroud, which may be oblique to the spring's radial orientation.

The tie rod 54 is supported at its top end by an upper support assembly which hangs from the top edge of the shroud. A pair of notches or slots are machined in the shroud head ring 28a of shroud head 28. The notches are positioned in alignment with a pair of bolted upper support plate segments 62 (see FIG. 3A) of the upper support assembly when the shroud head 28 is properly seated on the top surface of shroud flange 18a. These notches facilitate the coupling of the tie rod assembly to the shroud flange.

Figure 3A:
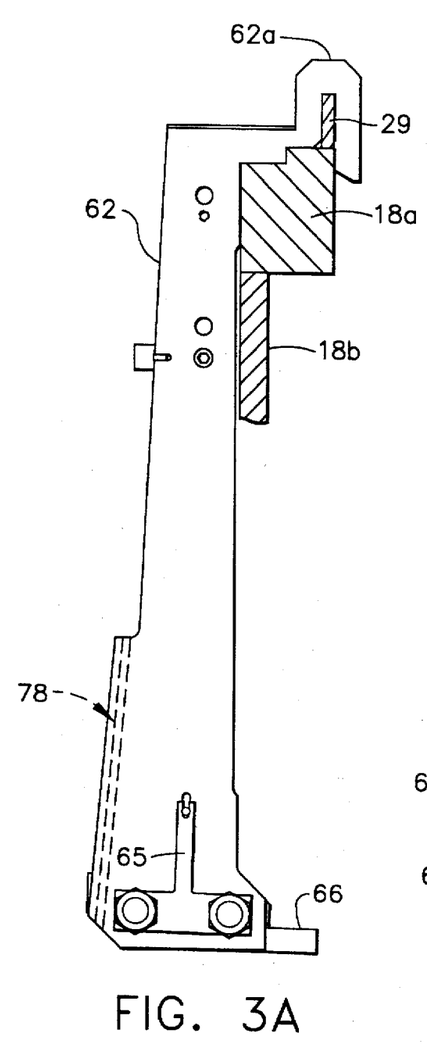
FIGS. 3A and 3B are rear and side elevation views respectively of the upper support assembly in accordance with another preferred embodiment of the invention.

The pair of notches at each tie rod azimuthal position receive respective hook portions 62a of the upper support plates 62. As best seen in FIG. 3A, each hook 62a conforms to the shape of the top surface of shroud flange 18a and the shape of the steam dam 29. The distal end of hook 62a hooks on the inner circumference of shroud dam 29. The upper support plates 62 are connected in parallel by a top support bracket 64 and a support block 66 which forms the anchor point for the top of the tie rod. Support block 66 has an unthreaded bore 68, tapered at both ends, which receives the upper end of tie rod 54.

Figures 4, 5:
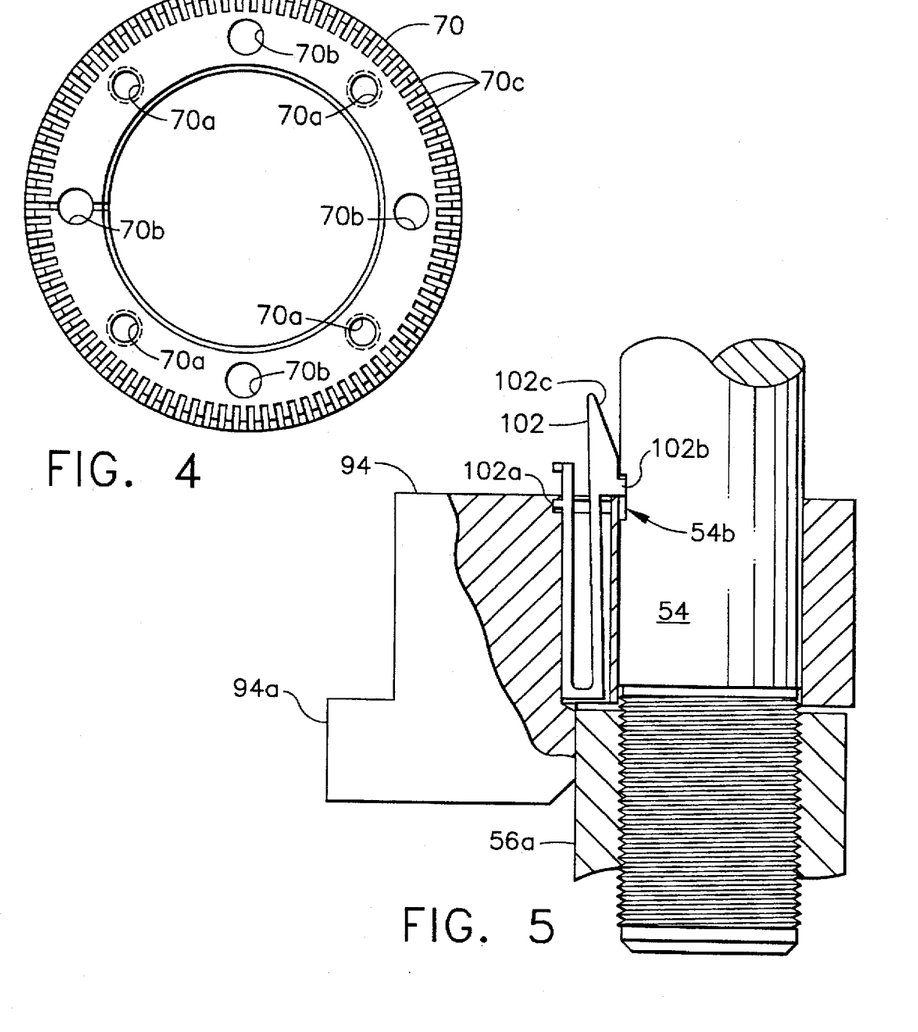
FIG. 4 is a plan view of the tie rod nut in accordance with the preferred embodiment of FIGS. 3A–3C.
FIG. 5 is a side elevation view of the lower stabilizer vessel contact spacer in accordance with another preferred embodiment of the invention.

After the upper end of tie rod 54 has been passed through bore 68, a threaded tensioning nut 70 is screwed onto the threaded portion 54a of tie rod 54. As shown in FIG. 4, the tensioning nut 70 has four threaded axial holes 70a circumferentially distributed at equiangular intervals on the top surface thereof. A remotely manipulated installation tool is coupled to the tensioning nut 70 by means of a corresponding plurality of bolts which are screwed into holes 70a. The nut 70 further has four unthreaded axial holes 70b circumferentially distributed at equiangular intervals on the top surface thereof for engagement with mating shear pins of the installation tool. The peripheral edge of the top surface of nut 70 has a multiplicity (e.g., 90) of radial slots 70c spaced at equiangular intervals (e.g., 4°).

Figure 3B:
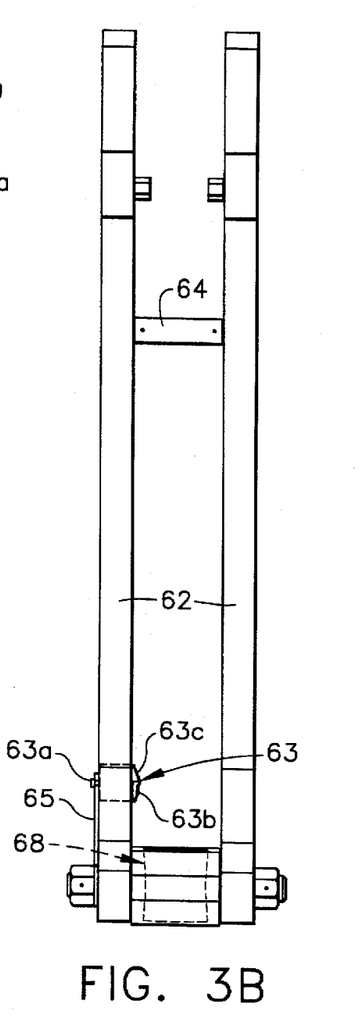
Figure 7A:
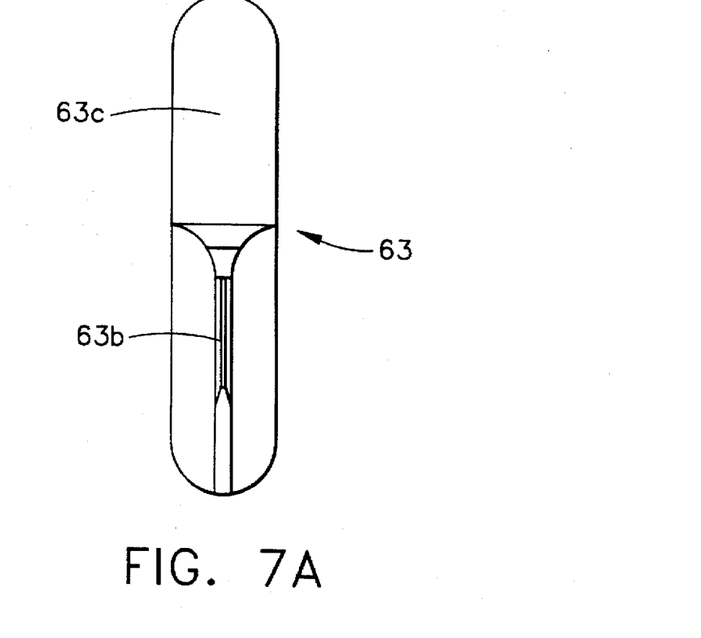
FIGS. 7A and 7B are front and side elevation views respectively of the latching mechanism in accordance with the preferred embodiment of FIGS. 3A–3C.
Figure 7B:
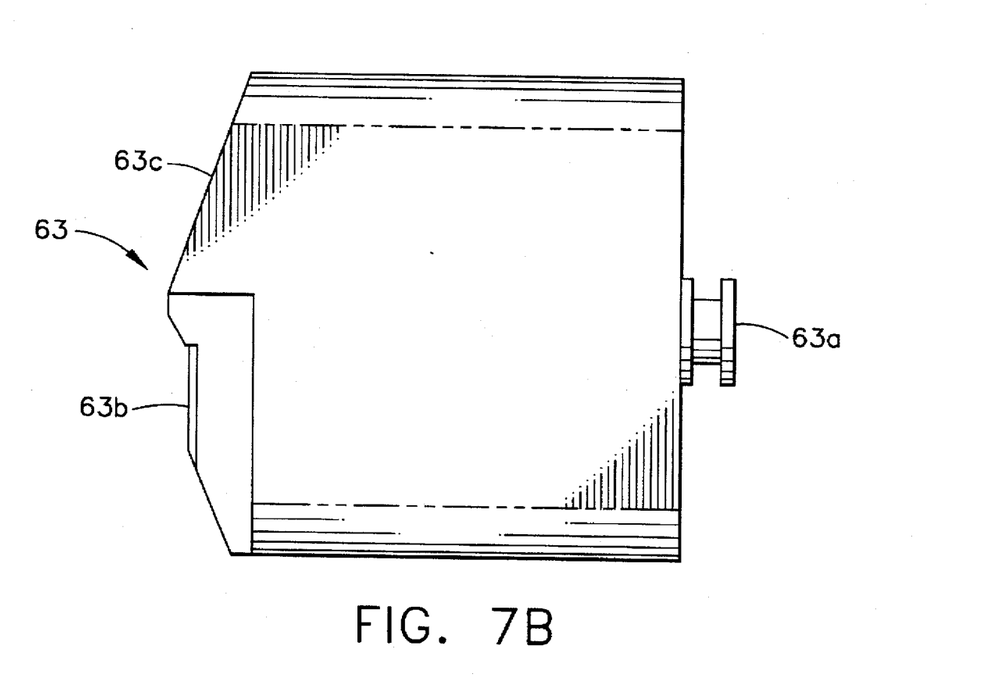

Referring to FIG. 3B, one of upper support plates 62 has an aperture in which a retainer 63 is slidably seated. One end of retainer 63 has a slotted projection 63a to which the end of a T-shaped spring 65 (best seen in FIG. 3A) is attached. The other end of retainer 63 has a key 63b (see FIGS. 7A and 7B) which fits into any one of the radial slots 70c. The spring 65 preloads the retainer from left to right in FIG. 3B. At its limit position, key 63b extends into one of the radial slots 70c of nut 70, thereby preventing vibration-induced rotation of nut 70.

The other end of retainer 63 is further provided with an oblique surface 63c disposed above the key 63b. When the tensioning nut/installation tool assembly are screwed onto the tie rod, the lower edge of the nut 70 will contact oblique surface 63c. As the nut/tool assembly moves down the tie rod, the nut acting on the oblique surface 63c will overcome the resistance of spring 65 and cam the key 63b so that it does not interfere with rotational engagement of nut 70. This enables nut 70 to be tightened by the installation tool until the nut is preloaded against the support block 66. As the nut is tightened, it bears against support block 66 and tensions the upper support and tie rod assembly with a desired preload. At that point the nut is tightened incrementally until the next radial slot opposes the retainer 63. Then the installation tool is disengaged from the nut, which allows spring 65 to preload retainer 63 forward until key 63c protrudes fully into the opposing radial slot 70c, thereby locking the tie rod nut 70 against rotation.

The assembly comprised of support plates 62 with hooks 62a, support block 66, tie rod 54, lower spring 56, clevis pin 60 and gusset plate 58 form a vertical load path by which the shroud flange 18a is connected to the shroud support plate 52. In the tensioned state, upper support plates 62 exert a restraining force on the top surface of the shroud flange 18a which opposes separation of the shroud at any assumed failed circumferential weld location.

Figure 2A:
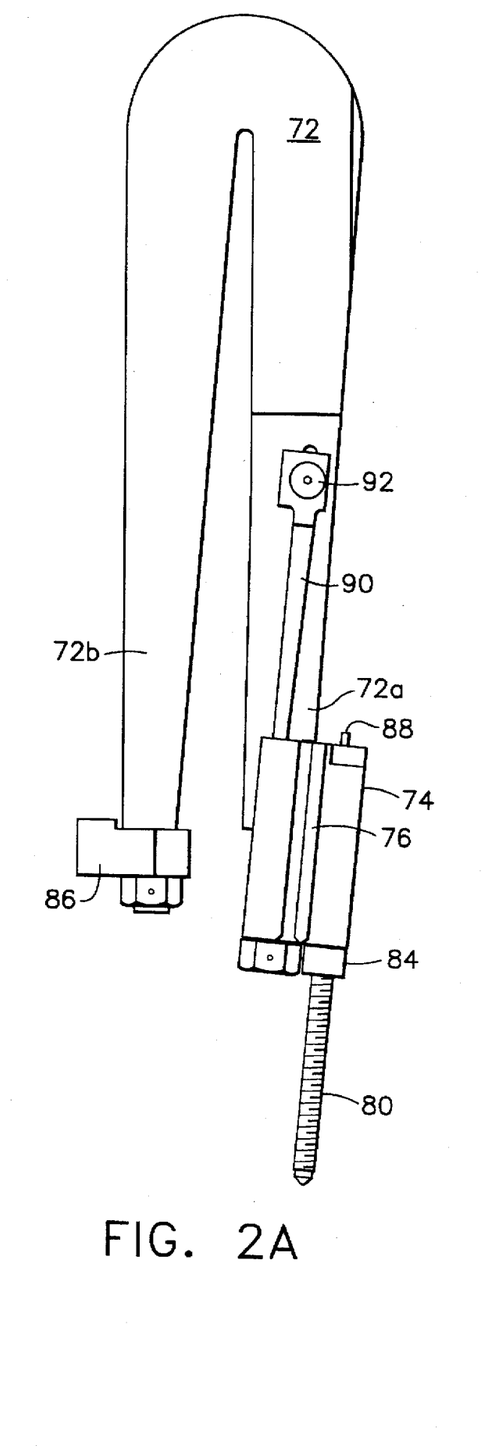
FIGS. 2A and 2B are rear and side elevation views respectively of the upper stabilizer assembly with jack bolt latches in accordance with one preferred embodiment of the invention.
Figure 2B:
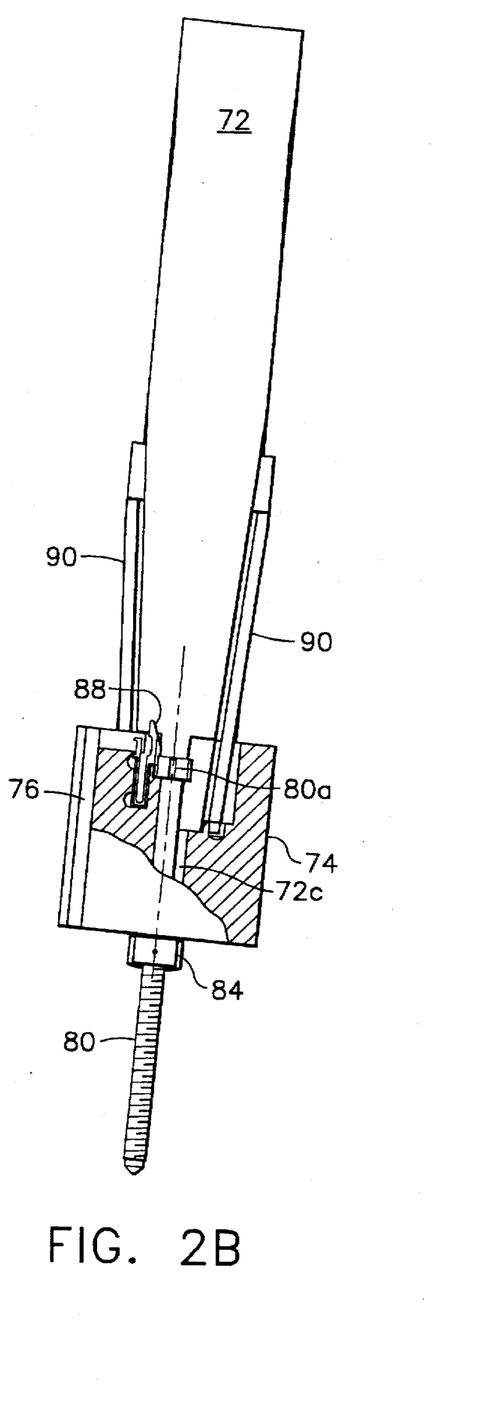

Referring to FIGS. 2A and 2B, the upper restraint spring 72 is a double cantilever "wishbone" design, to react the lateral seismic loads without adding bending load on the top support. The end of one arm 72a of spring 72 has an axle mounting 72c (see FIG. 2B) which is rotatably mounted in an unthreaded bore formed in an upper spring bracket 74. This allows the spring to rotate relative to the upper spring bracket 74. The end of the other arm 72b has an upper contact spacer 86 rotatably mounted thereon. Upper contact spacer 86 is designed to bear against the inner surface of the reactor pressure vessel wall.

Figure 3C:
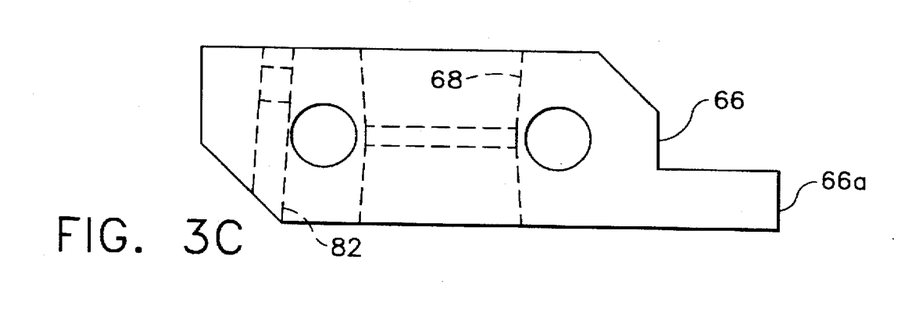
FIG. 3C is a side elevation view of the support block incorporated in the upper support assembly shown in FIGS. 3A and 3B.

The upper spring bracket 74 has a pair of parallel linear projections 76 which slide in corresponding grooves 78, formed on opposing surfaces of upper support plates 62, during installation of the upper spring assembly. The grooves 78 are oriented at an acute angle (e.g., 5°) relative to the vertical axis of the vessel inside surface. In addition, the upper spring assembly comprises a jack bolt 80 which passes through an unthreaded bore in the upper spring bracket 74. Longitudinal displacement of jack bolt 80 relative to upper spring bracket 74 is prevented by a shoulder under the head of jack bolt 80 and by a jack bolt sleeve 84, while allowing jack bolt 80 to rotate freely relative to upper spring bracket 74. A threaded end of jack bolt 80 projects beyond the upper spring bracket and is screwed into a threaded bore 82 (see FIG. 3C) in the support block 66. The threaded bore 82 is disposed parallel to the grooves 78 in the upper support plates 62. Thus, as the jack bolt is rotated, the upper spring bracket 74 and upper spring 72 coupled thereto translate in parallel with the grooves 78 until the upper contact spacer 86 on arm 72b is wedged against the inner surface of the reactor pressure vessel wall. The upper spring assembly is installed with enough elastic preload to prevent mechanical wear of its parts due to reactor vibration, the amount of preload being a function of the distance which jack bolt 80 travels along bore 82 in support block 66.

When the desired amount of preload has been attained, the jack bolt is locked against further rotation relative to upper spring bracket 74 by engagement of a pair of wishbone spring latches 88, only one of which is shown in FIG. 2B. Each latch 88 has the same geometry as the latch shown in FIGS. 13A and 13B. Each spring latch 88 has a short leg with a projection that interlocks with the upper spring bracket 74 and a long leg with a key that interlocks with one of a multiplicity of longitudinal slots 80a formed on the outer circumference of the head of jack bolt 80. The arrangement of these slots is identical to that shown in FIG. 12.

The tip of the long leg of spring latch 88 has a surface which is oblique relative to the leg axis. This oblique surface is contacted by a portion of a tool (not shown) which is used to screw and unscrew the jack bolt 80. The tool surface bears against the oblique surface, thereby camming the key on the long leg to a position where it will not interfere with the head of the jack bolt during jack bolt rotation. Thus, engagement of the torquing tool to the bolt also disengages the latches, leaving the bolt free to rotate.

In the event of seismic loading at some oblique angle, the spring 72 can rotate on its axle mounting 72c (see FIG. 2B) to absorb the azimuthal motion component, without transmitting oblique loading into the support block 66. Cantilever torsion arms 90 on each side of the upper spring 72 restore the rotational alignment of the spring after seismic deflection. Each torsion arm 90 has one end coupled to arm 72a at an intermediate point therealong by means of a torsion arm bolt 92. The other end of each torsion arm is coupled to the upper spring bracket 74. The upper contact spacer 86 which bears against the vessel 10 reacts the restraint load from the vessel and pivots to follow the spring rotation.

Referring back to FIG. 1, the spring arm 56a of lower spring 56 laterally supports the shroud 18 at the core plate 18g, against the vessel 10, via a lower contact spacer 94. The lower spring assembly is installed with a controlled preload, obtained by machining contact pad 94a of spacer 94 to match the measured assembly fit-up. As seen in FIG. 5, the top end of spring arm 56a has a threaded bore to provide the attachment for the bottom of the tie rod 54. The lower contact spacer 94 is coupled to the lower end of tie rod 54 via a wishbone spring latch 102. Spring latch 102 is installed with sufficient preload to prevent vibration-induced rubbing of parts when the lower contact and tie rod are coupled with play.

Figure 8A:
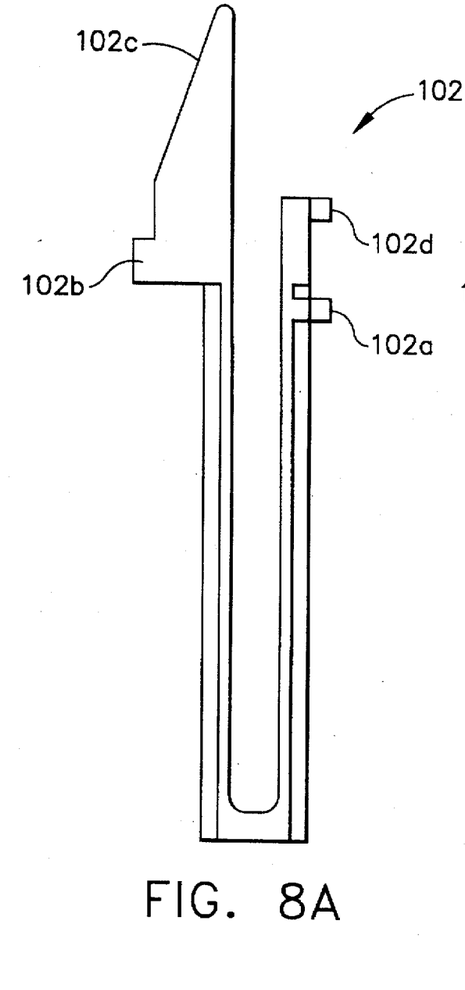
FIGS. 8A and 8B are side elevation and bottom plan views respectively of a wishbone spring latch in accordance with the preferred embodiment of FIG. 5.
Figure 8B:
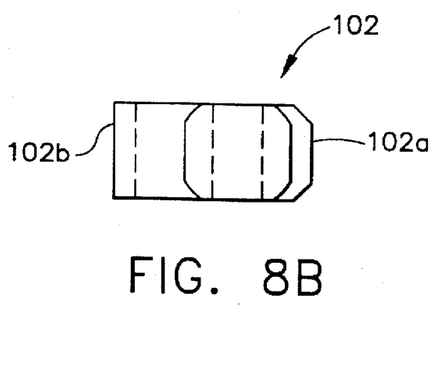

The spring latch 102 has a short leg with a projection 102a that interlocks with a recess formed in the contact spacer 94 and a long leg with a projection 102b that interlocks with a recess 54b formed in the tie rod. Thus, spring latch 102 blocks upward vertical displacement of lower contact spacer 94 relative to tie rod 54. The tip of the long leg of spring latch 102 has an oblique surface 102c which is engaged by a tool (not shown) for installing and removing the lower contact assembly. As a result of this engagement, the projection 102b is cammed to a position whereat it does not interfere with the tie rod, i.e., the lower contact spacer is free to slide or rotate relative to the tie rod 54. The spring latch 102 is shown in greater detail in FIGS. 8A and 8B.

The member 56d connecting the upper wishbone spring 56a, 56b to the clevis hook 56c is offset from the line of action between the lower end of tie rod 54 and the clevis pin 60 to provide a vertical spring compliance in the load path to the tie rod. Axial loads in the tie rod cause bending of the lower connecting member 56d and associated pivoting of the clevis hook 56c about the clevis pin 60. The specific configuration is designed to add the desired axial flexibility to the assembly to minimize loads on the tie rod due to differential thermal expansion, which could induce residual stress and cracking, or due to tilting motion of the shroud from seismic loads which could overload the tie rod.

The lateral seismic loads from the main mass of the reactor core are reacted (for a cracked shroud) by the upper and lower springs at the top guide 18c and core plate 18g, respectively. Gross motion limit stops are also mounted on the stabilizers to limit lateral displacement of other segments of the shroud due to circumferential weld failures. Each upper support block 66 has a limit stop 66a which blocks gross lateral deflection of the middle shroud wall section 18e in the event that the girth welds between section 18e and sections 18d and 18f become severed. If left unchecked, gross lateral deflection of middle shroud wall section 18e could damage peripheral fuel assemblies in the fuel core.

Figure 6:
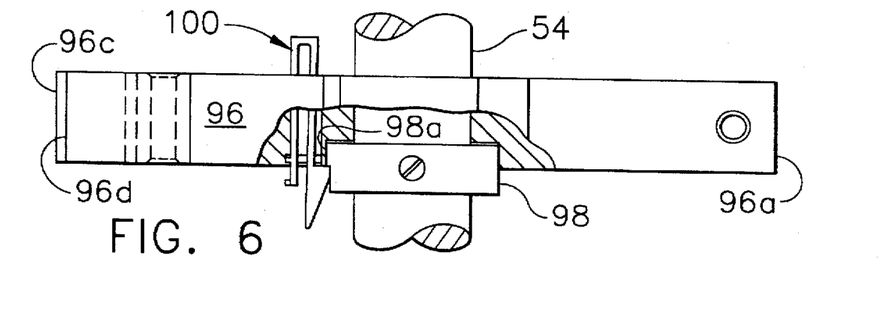
FIG. 6 is a side elevation view of the mid-support assembly in accordance with a further preferred embodiment of the invention.

A middle support 96 may be used to provide a limit stop 96a (see FIG. 6). To facilitate mounting of the middle support 96, a mid-support ring 98 is secured to the tie rod 54. The middle support 96 has a section of an annular recess counterbored in its bottom which form fits on ring 98, thereby preventing lateral shifting of middle support 96 relative to tie rod 54. The middle support 96 is latched to mid-support ring 98 by a wishbone spring latch 100, which blocks upward vertical displacement of middle support 96 relative to the tie rod 54. Spring latch 100 is installed with sufficient preload to prevent vibration-induced rubbing of parts when the middle support and tie rod are coupled with play.

Figure 9A:
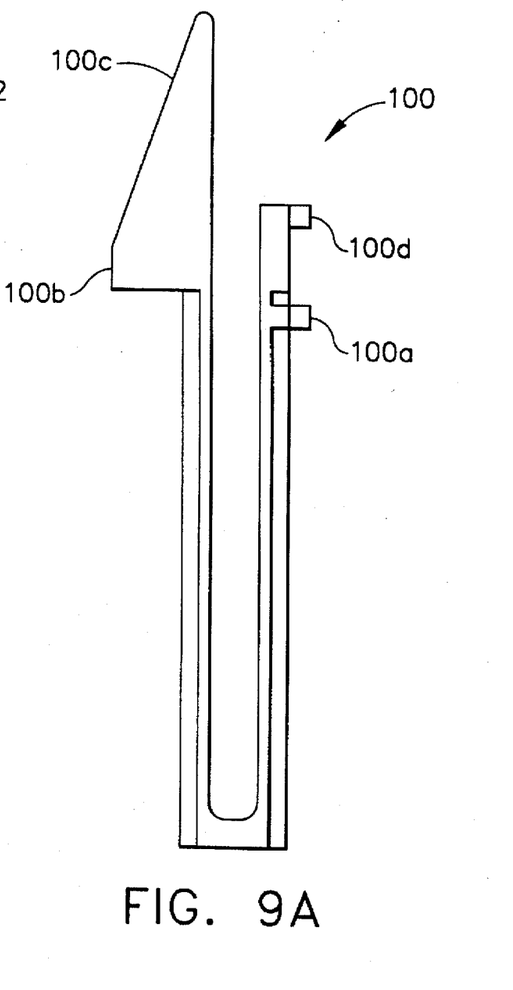
FIGS. 9A and 9B are side elevation and bottom plan views respectively of a wishbone spring latch in accordance with the preferred embodiment of FIG. 6.
Figure 9B:
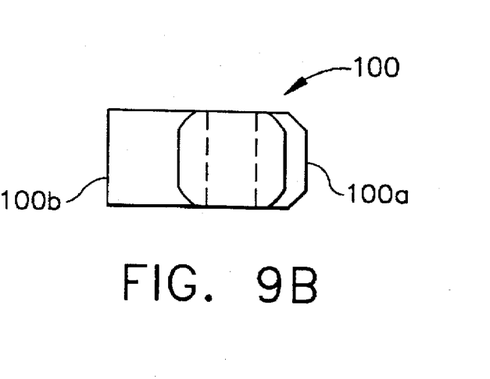

The spring latch 100 has a short leg with a projection that interlocks with the middle support 96 and a long leg with a projection 100a that latches underneath an offset 98a formed in the mid-support ring 98. Projection 100a has an oblique surface which is engaged by a tool (not shown) for installing and removing the mid-support and latch assembly. As a result of this engagement, the projection 100a is cammed to a position whereat it does not interfere with the mid-support ring 98, i.e., the middle support 96 is free to be lifted off of ring 98 and removed. The spring latch 100 is shown in greater detail in FIGS. 9A and 9B.

The middle support 96 is preloaded against the vessel wall at assembly by radial interference which bends the tie rod 54. Three contact pads (only pads 96c and 96d are visible in FIG. 6) are machined to mate with the vessel wall 10 such that the desired preload is produced in the tie rod. Thus, middle support 96 provides both a limit stop for the middle shroud wall section 18e and a mid-span support for the tie rod, improving its resistance to vibratory excitation failure.

Further, each lower spring 56 has a limit stop which blocks gross lateral deflection of the lower shroud wall 18f relative to the core plate support ring 18g in the event that the welds between core plate support ring 18g and lower shroud wall 18f become severed. Gross lateral deflection of lower shroud wall 18f could, if not checked, cause damage to the control rod guide tubes located underneath the core. The gusset 58 limits displacement of shroud support 50.

The limit stop 104 provides protection against permanent deformation of arms 56a and 56b in the unlikely event seismic loads exceed the plant's licensed design values. This assures safe shutdown of the plant and continued functioning of the restraints. The upper spring has a similar displacement limit built into its design, as the space between upper spring bracket 74 and upper contact spacer 86 defines the allowable amount of travel.

The shroud restraint components are constructed of austenitic stainless steel (e.g., Type 316) and Ni-Cr-Fe alloy X-750. Both are specified and fabricated with controls to assure maximum corrosion resistance in the BWR environment. The alloy X-750 is used where high strength or surface hardness is needed, such as spring latches, upper support plates, wishbone springs, tensioning nut, clevis pin, contact spacers, torsion arms, jack bolt and support block.

Figure 10:
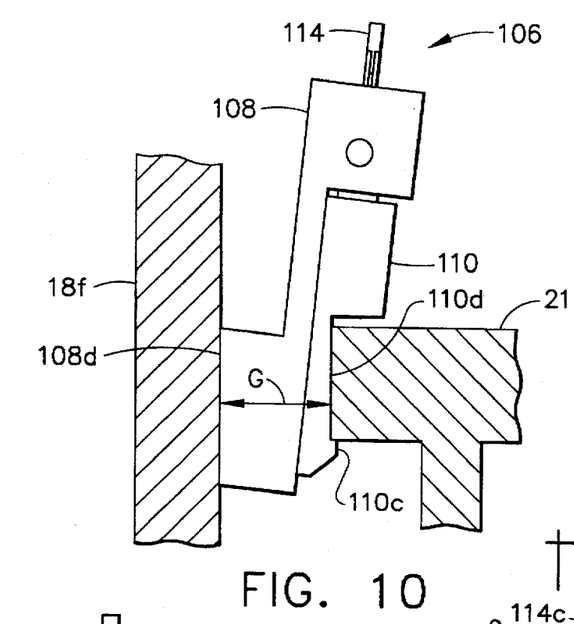
FIG. 10 is a detailed view of the portion of FIG. 1 inside the circle designated A, showing the core plate wedge assembly in accordance with a preferred embodiment of the invention.

As seen in FIG. 10, the core plate 21 is restrained against lateral deflection relative to the middle shroud wall section 18f by a core plate wedge assembly 106. A plurality of core plate wedge assemblies (e.g., four) are placed in the gap between the circular outer peripheral edge of the core plate and the circular cylindrical inner surface of the middle shroud wall 18d at respective azimuthal positions. These core plate wedge assemblies are wedged into place to maintain the spacing between the core plate and the shroud, thereby maintaining the alignment of the fuel assemblies. The core plate wedge assemblies are preferably located in azimuthal alignment with the shroud restraint assembly. Thus, the core plate wedge assembly in conjunction with the corresponding lateral shroud restraint assembly form a direct path for transmission to the reactor pressure vessel of a load exerted laterally by the fuel core.

Figure 11A:
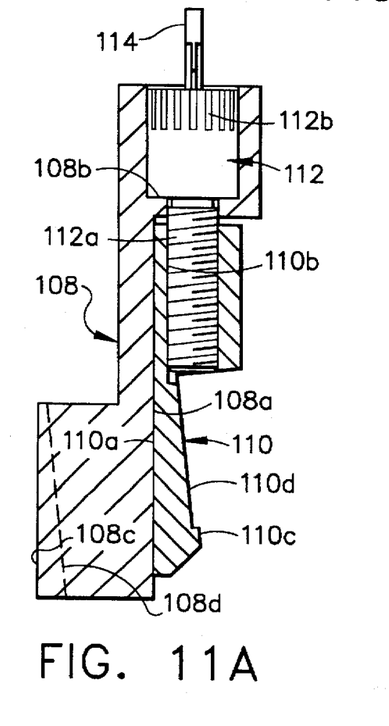
FIGS. 11A and 11B are partly sectioned side and elevation views, respectively, of the core plate wedge assembly of FIG. 10.
Figure 11B:
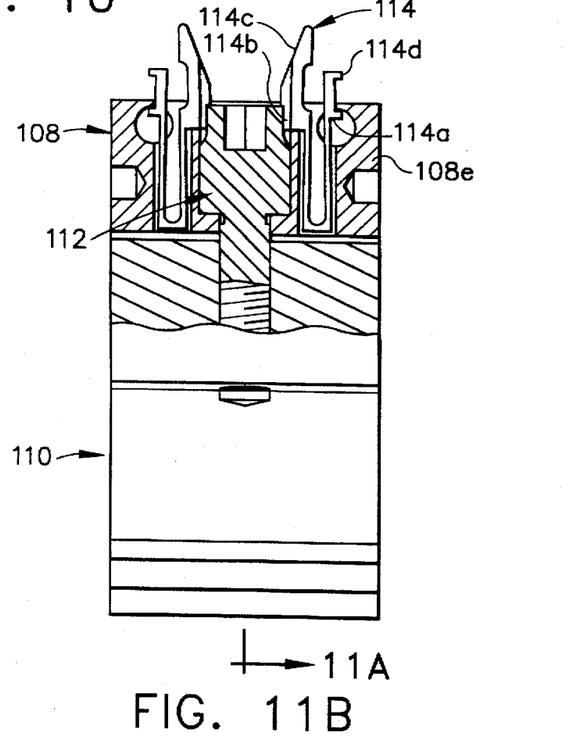

Referring to FIGS. 11A and 11B, the core plate wedge assembly 106 comprises a core plate wedge 108 and a core plate wedge clip 110. The core plate wedge 108 has a planar mating surface 108a and another planar surface 108c parallel thereto. The core plate wedge clip 110 has a planar mating surface 110a and another planar surface 110d which is at an oblique angle (e.g., 6°) relative to surface 110a. In the untrimmed state, the surface 108d of core plate wedge 108 is parallel to the 108a.

Prior to assembly of core plate wedge 108 and core plate wedge clip 110, the gap G between the outer circumferential surface of core plate 21 and the inner circumferential surface of middle shroud wall section 18f (see FIG. 10) is measured. Then the core plate wedge 108 is trimmed as shown in FIG. 11A to form a new surface 108d which, when core plate wedge 108 is coupled to core plate wedge clip 110 in its final wedged position, will be parallel to surface 110d and separated therefrom by a distance which increases to approximately G as the bolt is tightened and parts 108 and 110 slide against each other.

To assemble the core plate wedge assembly 106, the mating surface 110a of core plate wedge clip 110 is placed flush against the mating surface 108a of core plate wedge 108 and then a wedge bolt 112 is used to couple the core plate wedge 108 and the core plate wedge clip 110. The core plate wedge 108 has a first unthreaded circular cylindrical bore of first diameter for receiving the circular cylindrical head of wedge bolt 112 and a second unthreaded circular cylindrical bore of second diameter for receiving the threaded shaft 112a of wedge bolt 112. The bore of first diameter communicates with the bore of second diameter at a shoulder 108b. Longitudinal displacement of wedge bolt 112 relative to core plate wedge 108 is prevented by shoulder 108b, while allowing wedge bolt 112 to rotate freely relative to core plate wedge 108. The core plate wedge clip 110 has a threaded bore 110b which threadably engages the threaded shaft 112a as the wedge bolt 112 is screwed in. As the wedge bolt 112 is rotated in the direction of tightening, the core plate wedge clip 110 slides relative to core plate wedge 108 along the bolt axis. To facilitate sliding of mating surfaces 108a and 110a relative to each other, a lubricant may be applied to one or both mating surfaces prior to assembly.

In the initial configuration of core plate wedge assembly 106, core plate wedge clip 110 engages only a small portion of the threaded shaft 112a of wedge bolt 112 and occupies an initial axial position relative to core plate wedge 108. In this initial axial position, the distance separating surfaces 108d and 110d is less than the gap G by an amount sufficient to allow the latching projection 110c on core plate wedge clip 110 to pass through the gap. The core plate wedge assembly 106 is then held at an elevation such that when the wedge bolt 112 is tightened, the latching projection 110c will hook underneath the core plate 21, as seen in FIG. 10, as core plate wedge clip 110 travels axially toward the bolt head. At the same time, the distance separating surfaces 108d and 110d increases. When the distance separating surfaces 108d and 110d equals the gap G, the surface 108d contacts the middle shroud wall 18 and the surface 110d contacts the core plate 21. The wedge bolt 112 can then be tightened until the desired preload is attained. Once the core plate wedge 108 has been trimmed, the amount of preload is a function of the distance which core plate wedge clip 110 travels relative to the core plate wedge. In this state the core plate wedge assembly 106 maintains the spacing G between the core plate and the shroud and transmits a load from the core plate to the shroud.

Figure 12:
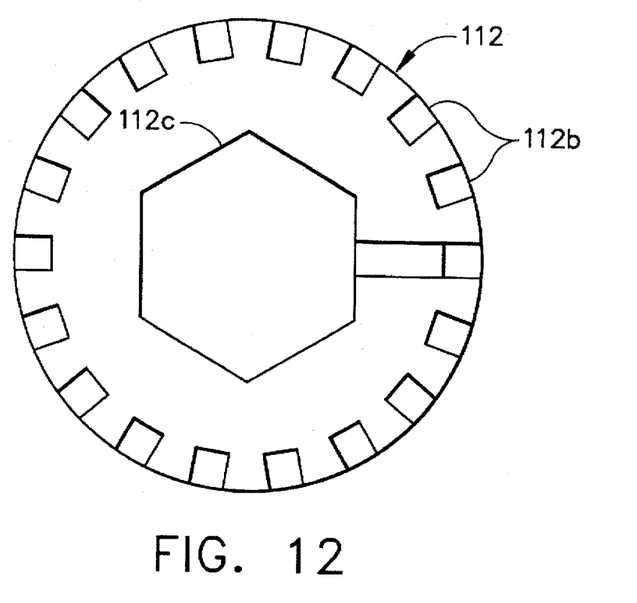
FIG. 12 is a plan view of the wedge bolt incorporated in the core plate wedge assembly shown in FIG. 11B. (The plan view is the same for the jack bolt incorporated in the upper stabilizer assembly shown in FIG. 2B.)
Figure 13A:
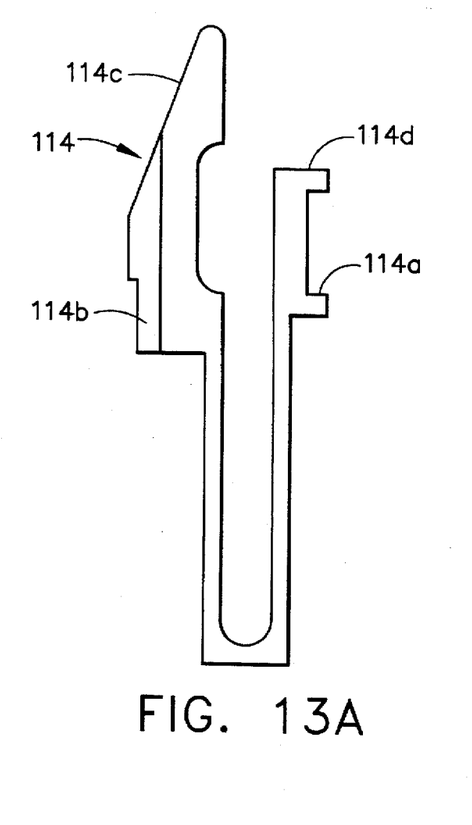
FIGS. 13A and 13B are side elevation and bottom plan views, respectively, of the wedge bolt latches incorporated in the core plate wedge assembly shown in FIG. 11B. (These views are the same for the jack bolt latches incorporated in the upper stabilizer assembly shown in FIG. 2B.)
Figure 13B:
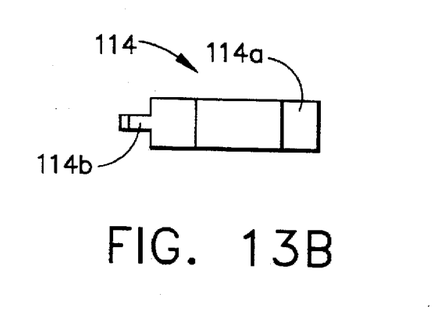

When the desired amount of preload has been attained, the wedge bolt 112 is locked against further rotation relative to the core plate wedge 108 by engagement of a pair of wishbone spring latches 114. As best seen in FIG. 11B, each spring latch 114 has a short leg with a projection 114a that interlocks with the core plate wedge 108 and a long leg with a key 114b that interlocks with one of a multiplicity of longitudinal slots 112b (see FIGS. 11A and 12) formed on the outer circumference of the head of wedge bolt 112. The tip of the long leg of spring latch 114 has a surface 114c which is oblique relative to the leg axis. This oblique surface is contacted by a portion of a tool (not shown) which is used to screw and unscrew the wedge bolt 112. The tool surface bears against the oblique surface, thereby camming the key on the long leg to a position where it will not interfere with the head of the wedge bolt during wedge bolt rotation. As seen in FIG. 12, the head of wedge bolt 112 has an axial recess 112c of hexagonal cross section for receiving a form-fitting portion of the tool to rotate the bolt and transmit preload torque. As before, only the insertion of the torquing tool is required to disengage the locking latch so that wedge bolt 112 is free to turn.

In addition, the short leg of the spring latch 114 has a projection 114d which can be gripped by a remotely manipulated tool in the event that spring latch 114 must be removed. To remove the spring latch, the short leg must be displaced toward the long leg by an amount sufficient to enable projection 114a to clear the interfering portion 108e of the core plate wedge 108. The spring latch 114 is shown in greater detail in FIGS. 13A and 13B.

In accordance with the preferred embodiment, the core plate wedge and core plate wedge clip are made of austenitic stainless steel (e.g., Type 316). The wedge bolt and associated spring latch are made of Ni-Cr-Fe alloy X-750. Both are specified and fabricated with controls to assure maximum corrosion resistance in the BWR environment.

The preferred embodiments of the spring latching mechanisms in accordance with the invention have been disclosed for the purpose of illustration. Variations and modifications of the disclosed structures which fall within the concept of this invention will be readily apparent to persons skilled in the art of mechanical engineering. All such variations and modifications are intended to be encompassed by the claims set forth hereinafter.

I claim:

1. A spring latching mechanism comprising first and second straight legs integrally connected at one end to a base, said first and second legs and said base forming a generally U-shaped member with said first and second legs being mutually parallel in an unflexed state, said first leg having a first projection extending perpendicular to said first leg and away from said second leg, said first projection having a planar end surface and a planar latching surface which meets said planar end surface at a juncture, said planar latching surface being perpendicular to said planar end surface, and said second leg having a second projection extending perpendicular to said second leg and away from said first leg, said second projection having mutually parallel first and second planar side surfaces and a planar end surface perpendicular to said first and second planar side surfaces and parallel to said planar end surface of said first projection, said planar end surface of said first projection being separated from said planar end surface of said second projection by a predetermined distance when said member is in said unflexed state, wherein said first and second legs can be flexed toward each other to decrease the distance separating said planar end surface of said first projection from said planar end surface of said second projection, further comprising a camming projection integrally formed with and extending from said second projection, said camming projection having mutually parallel first and second planar side surfaces which are respectively coplanar with said first and second planar side surfaces of said second projection, and further having a planar camming surface perpendicular to said first and second planar side surfaces and oriented at an acute angle relative to said planar end surface of said second projection.

2. The spring latching mechanism as defined in claim 1, wherein said first leg has a third projection extending parallel to said first projection and located at a tip of said first leg.

3. An apparatus comprising:
a bolt having a threaded shaft and a head with an outer circumferential surface, said outer circumferential surface of said head having a multiplicity of longitudinal slots at spaced intervals around a circumference;
a first assembly component having a threaded bore which is threadably coupled to said threaded shaft of said bolt;
a second assembly component which is fixed relative to said first assembly component and has a longitudinal blind recess formed therein and a transverse blind recess which communicates with said longitudinal blind recess; and
a spring latching mechanism partly inserted in said longitudinal blind recess and comprising first and second legs integrally connected at one end to a base, said first and second legs and said base forming a generally U-shaped member in an unflexed state, said first leg having a first projection extending perpendicular to said first leg and into one of said longitudinal recesses in said bolt head, and said second leg having a second projection extending perpendicular to said second leg and into said transverse blind recess in said second assembly component, wherein said spring latching mechanism locks said bolt against further rotation relative to said first assembly component, and said first and second legs can be flexed toward each other to allow removal of said spring latching mechanism by a longitudinal motion.

4. The apparatus as defined in claim 3, wherein said second leg is longer than said first leg and has a camming section which forms a distal end of said second leg, said camming section having an oblique surface located between a tip of said distal end and said second projection, said oblique surface being oriented such that said second leg is flexed toward said first leg when said oblique surface is contacted by a tool traveling parallel to said second leg in a direction from said distal end of said second leg toward an end of said second leg which is connected to said base.

5. The apparatus as defined in claim 3, wherein said first leg has a third projection extending generally parallel to said first projection and located at a tip of said first leg.

6. An apparatus comprising:
a structural support assembly;
a first assembly component fixed relative to said structural support assembly and having a latching recess;
a second assembly component coupled to said first assembly component with preload and having a longitudinal blind recess formed therein and a transverse blind recess which communicates with said longitudinal blind recess; and.
a spring latching mechanism partly inserted in said longitudinal blind recess and comprising first and second legs integrally connected at one end to a base, said first and second legs and said base forming a generally U-shaped member in an unflexed state, said first leg having a first projection extending perpendicular to said first leg and into said latching recess in said first assembly component, and said second leg having a second projection extending perpendicular to said second leg and into said transverse blind recess in said second assembly component, wherein said spring latching mechanism locks said first assembly component against translation in a predetermined direction relative to said second assembly component, and said first and second legs can be flexed toward each other to allow removal of said spring latching mechanism, wherein said second leg is longer than said first leg and has a camming section which forms a distal end of said second leg, said camming section having an oblique surface located between a tip of said distal end and said second projection, said oblique surface being oriented such that said second leg is flexed toward said first leg when said oblique surface is contacted by a tool traveling parallel to said second leg in a direction from said distal end of said second leg toward an end of said second leg which is connected to said base.

7. An apparatus comprising:
a structural support assembly;
a first assembly component fixed relative to said structural support assembly and having a latching recess;
a second assembly component coupled to said first assembly component with preload and having a longitudinal blind recess formed therein and a transverse blind recess which communicates with said longitudinal blind recess; and a spring latching mechanism partly inserted in said longitudinal blind recess and comprising first and second legs integrally connected at one end to a base, said first and second legs and said base forming a generally U-shaped member in an unflexed state, said first leg having a first projection extending perpendicular to said first leg and into said latching recess in said first assembly component, and said second leg having a second projection extending perpendicular to said second leg and into said transverse blind recess in said second assembly component, wherein said spring latching mechanism locks said first assembly component against translation in a predetermined direction relative to said second assembly component, and said first and second legs can be flexed toward each other to allow removal of said spring latching mechanism, wherein said first leg has a third projection extending generally parallel to said first projection and located at a tip of said first leg.

8. An apparatus comprising:

a structural support assembly;

a first assembly component fixed relative to said structural support assembly and having a latching recess;

a second assembly component coupled to said first assembly component with preload and having a longitudinal blind recess formed therein and a transverse blind recess which communicates with said longitudinal blind recess; and a spring latching mechanism partly inserted in said longitudinal blind recess and comprising first and second legs integrally connected at one end to a base, said first and second legs and said base forming a generally U-shaped member in an unflexed state, said first leg having a first projection extending perpendicular to said first leg and into said latching recess in said first assembly component, and said second leg having a second projection extending perpendicular to said second leg and into said transverse blind recess in said second assembly component, wherein said spring latching mechanism locks said first assembly component against translation in a predetermined direction relative to said second assembly component, and said first and second legs can be flexed toward each other to allow removal of said spring latching mechanism, wherein said structural support assembly comprises a reactor pressure vessel, a shroud and a shroud support plate for supporting said shroud in said reactor pressure vessel with an annular space therebetween, said first assembly component comprises a tie rod installed in said annular space, and said second assembly component comprises a contact spacer arranged between said tie rod and said reactor pressure vessel.

9. An apparatus comprising:

a reactor pressure vessel;

a shroud;

a shroud support plate for supporting said shroud in said reactor pressure vessel with an annular space therebetween;

an upper support subassembly supported by said shroud, said upper support subassembly having an aperture;

a lower support subassembly supported by said shroud support plate;

a threaded rod having a bottom end secured to said lower support subassembly and having a top end loosely coupled to said upper support subassembly;

a threaded nut threadably coupled to said threaded rod and having a contact surface which bears against a surface of said upper support assembly and a multiplicity of longitudinal slots at spaced intervals around a circumference; and a spring latching mechanism having a first part attached to said upper support assembly, and a second part connected to said first part, said second part being partly inserted in said aperture in said upper support assembly and having a tip which projects into one of said longitudinal slots in said threaded nut, wherein said spring latching mechanism locks said threaded nut against further rotation relative to said threaded rod, and said first part of said spring latching mechanism can be flexed away from said threaded nut to allow de-torquing of said threaded nut.

10. The apparatus as defined in claim 9, wherein said first part of said spring latching mechanism comprises a cantilever spring and said second part of said spring latching mechanism comprises a latch key.

* * * * *